US008996989B2

(12) United States Patent
Fox

(10) Patent No.: US 8,996,989 B2
(45) Date of Patent: Mar. 31, 2015

(54) COLLABORATIVE FIRST ORDER LOGIC SYSTEM WITH DYNAMIC ONTOLOGY

(75) Inventor: David Fox, La Jolla, CA (US)

(73) Assignee: Seereason Partners, LLC, La Jolla, CA (US)

(*) Notice: Subject to any disclaimer, the term of this patent is extended or adjusted under 35 U.S.C. 154(b) by 811 days.

(21) Appl. No.: 13/294,147

(22) Filed: Nov. 10, 2011

(65) Prior Publication Data

US 2013/0124397 A1    May 16, 2013

(51) Int. Cl.
*G06F 17/00* (2006.01)
*G06Q 10/10* (2012.01)
*G06F 17/21* (2006.01)
*G06Q 50/00* (2012.01)

(52) U.S. Cl.
CPC .............. *G06Q 10/10* (2013.01); *G06F 17/21* (2013.01); *G06Q 50/01* (2013.01)
USPC ........................................................ 715/236

(58) Field of Classification Search
CPC ....................................................... G06F 17/21
See application file for complete search history.

(56) References Cited

U.S. PATENT DOCUMENTS

| 6,239,368 | B1 * | 5/2001 | Gretz ................................ 174/57 |
| 7,225,183 | B2 * | 5/2007 | Gardner ................................. 1/1 |
| 7,685,140 | B2 * | 3/2010 | Jackson ..................... 707/999.1 |
| 8,359,191 | B2 * | 1/2013 | Chen et al. ........................ 704/9 |
| 2004/0010491 | A1 * | 1/2004 | Riedinger .......................... 707/3 |
| 2004/0230572 | A1 * | 11/2004 | Omoigui ........................... 707/3 |
| 2005/0262128 | A1 * | 11/2005 | Goodwin et al. ............. 707/102 |
| 2006/0074980 | A1 * | 4/2006 | Sarkar ........................ 707/104.1 |

OTHER PUBLICATIONS

Moench, et al., "Semantic Miner—Ontology Based Knowledge Retrieval", Journal of Universal Computer Science, vol. 9, No. 7 (2003), p. 682-696.*
Dou, et al., "Ontology-based Integration for Relational Databases", SAC'06 April 2327, 2006, Dijon, France, Copyright 2006 ACM, p. 1-6.*

* cited by examiner

*Primary Examiner* — Amelia Tapp
(74) *Attorney, Agent, or Firm* — ARC IP Law, PC; Joseph J. Mayo

(57) ABSTRACT

A collaborative first order logic system with dynamic ontology for example that enables collaborative discussion of documents, subjects associated within the documents, assertions about the subjects and theorems that utilize the assertions along with dynamic creation and association of two or more subjects that may represent the same thing. Enables geographical and temporal displays of assertions and opinions regarding the assertions.

17 Claims, 15 Drawing Sheets

FIGURE 5B

9 Comments on D5

David Fox
Insurers already factor climate change into their models for measuring, pricing and distributing risk. So either they are lying or climate change is real.

8 weeks ago · spam · permalink

David
Whether or not fossil fuels are destroying the environment, we should move away from them for other reasons.

7 weeks ago · spam · permalink

David
The position "not A79" is difficult to support, since it is hard to argue that some piece of evidence might not come along that would convince you to change your mind. So it seems that most people need to justify their beliefs in light of something like "probably not A79, but maybe A79."

7 weeks ago · spam · permalink

FIGURE 5C

Related Assertions

- A64: (hidden)
- A66: $\forall x: \forall y:$ Human Activity$_{S33}(x) \wedge$ Global Warming$_{S28}(y) \wedge$ Cause Of$_{S32}(x, y) \Rightarrow$ Anthropogenic Global Warming$_{S31}(y)$
- A77: $\exists x:$ Global Warming$_{S28}(x)$
- A78: $\exists x:$ Climate Change$_{S30}(x)$
- A79: $\exists x:$ Anthropogenic Global Warming$_{S31}(x)$
- A80: $\forall x:$ someone who accepts A79$(x) \Rightarrow$ someone who accepts A77$(x)$
- A90: (hidden)
- A91: (hidden)
- A93: $\exists x:$ A79$(x) \vee \forall x: \neg$ A79$(x)$
- A102: $\forall x:$ carbon dioxide$_{S29}(x) \Rightarrow$ Greenhouse Gasses$_{S34}(x)$
- A104: $\forall x:$ Cause Of$_{S32}(x,$ Human Activity$_{F33}) \Leftrightarrow$ Anthropogenic$_{S40}(x)$
- A113: $\forall x:$ Global Warming$_{S28}(x) \Rightarrow$ Climate Change$_{S30}(x)$

All Assertions

- Assertions:
  - A139: (hidden)
  - A135: ∀x: parents of$_{S42}$(U.S. Senator from Florida$_{F42}$, x) ⇒ Fled$_{S44}$(Fidel Castro$_{F43}$, x)
  - A113: ∀x: Global Warming$_{S28}$(x) ⇒ Climate Change$_{S40}$(x) *Contingent*
  - A104: ∀x: Cause Of$_{S22}$(x, Human Activity$_{F23}$) ⇒ Anthropogenic$_{S40}$(x)
  - A102: ∀x: carbon dioxide$_{S29}$(x) ⇒ Greenhouse Gasses$_{S44}$(x)
  - A93: ∃x: A79(x) ∨ ∀x: ¬A79(x)
  - A91: (hidden)
  - A90: (hidden)
  - A80: ∀x: someone who accepts A79(x) ⇒ someone who accepts A77(x)
  - A79: ∃x: Anthropogenic Global Warming$_{S31}$(x)
  - A78: ∃x: Climate Change$_{S40}$(x)
  - A77: ∃x: Global Warming$_{S28}$(x)
  - A66: ∀x: ∀y: Human Activity$_{S23}$(x) ∧ Global Warming$_{S28}$(y) ∧ Cause Of$_{S22}$(x, y) ⇒ Anthropogenic Global Warming$_{S31}$(y)
  - A65: ∀x: ∀x: Commentary: Zero
  - A64: (hidden)
  - A43: ∀x: the pursuit of Happiness$_{S23}$(x) ⇒ certain unalienable Rights$_{S12}$(x)
  - A42: ∀x: Liberty$_{S22}$(x) ⇒ certain unalienable Rights$_{S17}$(x)
  - A41: ∀x: Life$_{S21}$(x) ⇒ certain unalienable Rights$_{S17}$(x)
  - A40: ∀x: ∀y: men$_{S15}$(x) ∧ certain unalienable Rights$_{S17}$(y) ⇒ endowed by their Creator with$_{S20}$(x, y)

Theorem T1 by David Fox

- ☑ * <u>A4</u>: ∀x: Socrates$_{S1}$(x)⇒Man$_{S2}$(x)
- ☑ * <u>A5</u>: ∀x: Man$_{S2}$(x)⇒Mortals$_{S3}$(x)
- ☐ <u>A6</u>: ∃x: Socrates$_{S1}$(x)
- ☑ * <u>A8</u>: ∀x: Socrates$_{S1}$(x)⇒Mortals$_{S3}$(x)
- ☑ * <u>A9</u>: ∀x: Socrates$_{S1}$(x)⇒¬Mortals$_{S3}$(x)

<u>Copy and edit this theorem...</u>

▶                              0 Comments on T1

No comments yet.
<u>add a comment</u>

Related Assertions
(none)

Related Documents
<u>D1</u>: A syllogism of type modus ponens from Aristotle's Organon.

Related Theorems
(none)

Equivalence Assertions
(none)

Related Subjects
<u>S1</u>: "Socrates"
<u>S2</u>: "Man"
<u>S3</u>: "Mortals"

[Tabs: HOME | SEARCH | DOCUMENTS | SUBJECTS | ASSERTIONS | THEOREMS | USERS | ACCOUNT | LOG OUT | HELP]

FIGURE 11

Related Documents
D5: Topic page - Global Warming, AGW, Climate Change

☐ A115: U14:Anonymous believes A80 is Disproved
▪ ▪ ▪ A79: ∃x: Anthropogenic Global Warming$_{S31}$(x)

Edit this theorem...

▸         o Comments on T7

No comments yet.
add a comment

Related Theorems
(none)

Equivalence Assertions
(none)

Related Subjects
S28: "Global Warming"
S30: "Climate Change"
S31: "Anthropogenic Global Warming$_{S28}$"
S32: "Cause Of"
S33: "Human Activity"
S40: "Anthropogenic"

Related Assertions
▪ ▪ A64: (hidden)
▪ ▪ A66: ∀x: ∀y: Human Activity$_{S33}$(x)∧Global Warming$_{S28}$(y)∧Cause Of$_{S32}$(x, y)⇒Anthropogenic Global Warming$_{S31}$(y)
▪ ▪ A77: ∃x: Global Warming$_{S28}$(x)
▪ ▪ A78: ∃x: Climate Change$_{S30}$(x)
▪ ▪ A80: ∀x: someone who accepts A79(x)⇒someone who accepts A77(x)
▪ ▪ A90: (hidden)
▪ ▪ A91: (hidden)
▪ ▪ A93: ∃x: A79(x)∨∀x: ¬A79(x)
▪ ▪ A104: ∀x: Cause Of$_{S32}$(x, Human Activity$_{S33}$)⇒Anthropogenic$_{S40}$(x)
▪ ▪ A113: ∀x: Global Warming$_{S28}$(x)⇒Climate Change$_{S30}$(x)

©2011 SeeReason Partners

COLLABORATIVE FIRST ORDER LOGIC SYSTEM WITH DYNAMIC ONTOLOGY

BACKGROUND OF THE INVENTION

1. Field of the Invention

One or more embodiments of the invention are related to the field of computer systems. More particularly, but not by way of limitation, one or more embodiments of the invention enable a collaborative first order logic system with dynamic ontology for example that enables collaborative discussion of documents, subjects associated within the documents, assertions about the subjects and theorems that utilize the assertions along with dynamic creation and association of two or more subjects that may represent the same thing.

2. Description of the Related Art

Standalone first order logic systems exist, but fail to enable collaborative discussion in a robust manner since the ontology of the subjects is fragmented. For example, there are many names in use for "Global Warming", some of which are used in a scientific setting and some of which are used in a political setting. Discussions about this topic are thus fragmented since the assertions about two subjects with different names are generally not connected. Other known implementations require formal language knowledge that makes general use by the population difficult if not impossible.

For at least the limitations described above there is a need for a collaborative first order logic system with dynamic ontology.

BRIEF SUMMARY OF THE INVENTION

One or more embodiments described in the specification are related to a collaborative first order logic system with dynamic ontology. One or more embodiments of the system are implemented with a server computer, a database and optionally a website that enables discussion among large numbers of users in the language of first order logic. One or more embodiments may utilize also computers coupled with the server computer for a non-HTML based application interface as one skilled in the art will appreciate. For ease of discussion all references to a website including the claims are intended to signify a website or an equivalent standalone application for execution on a computer for example. In one or more embodiments of the system, multiple users are provided with access to data in the database via a website (or application). The website (displays the data which includes documents, subjects associated with the documents, associations between the subjects, assertions associated with the subjects and opinions regarding the assertions. In one or more embodiments, the website accepts input from the users to alter the associations between the subjects. The website commands the server computer to alter the associations between the subjects in the database. This ability provided by one or more embodiments of the system increases the effectiveness of the system by solving the ontology problem, i.e., the problem of naming the elements or subjects that the system enables reasoning about and which may be called different things by different people or groups of people. One or more embodiments of the invention utilize a natural language interface to query the user for logical inputs so that users do not need to understand the syntax of first order logic equations. For example, the system may query a user to obtain input to questions such as "Do you believe Socrates is a man?" and based on the response accepted by the system from the user, the system may create an assertion in first order logic syntax that is stored in the system without requiring the user to input first order logic symbols. The system may also utilize natural language processing to resolve grammatical issues regarding questions to ask, for example by querying an advanced user as to whether the grammar for asking a natural language question is correct for a given first order logic assertion.

In one or more embodiments the website is configured to accept an opinion from a first user related to an assertion associated with one or more subjects wherein the assertion is made by another user. This allows user-dependent views of the first order logic. By so doing, embodiments of the system enable a dynamic ontology system that enables similar subjects to be grouped together when they mean the same thing to a particular user. Hence, the system is not hard coded to a given static ontology, but rather can change over time and per user, which is unknown in the art. The system provides for domain knowledge that is not fully understood, but rather changes over time and also provides for disagreement between users based on the subjects and their similarity or equivalence for example. The system thus provides for a dynamic ontology that allows for open and dynamic subject associations, which greatly increases the usefulness of the system.

In addition, the database may also store theorems associated with the assertions. The theorems for example provide a line of reasoning associated with the assertions. One or more embodiments of the invention provide a theorem analyzer that automatically finds any logical contradictions for example. One or more embodiments of the server computer are configured to analyze the assertions and display any logical contradictions with the theorems. Other embodiments include data in the database related to opinions regarding the associations between said subjects wherein the website is configured to display the opinions regarding the associations between the subjects and accept an opinion from a user related to an association between one or more subjects wherein the association is made by another user. This allows for per-user views of the associations in the system, which is unknown in the art since known first order logic systems employ a static ontology.

Embodiments of the website may display a map of the assertions associated with one or more subject with respect to locations of the users that made the assertions. This allows for maps of assertions to be displayed that show for example different assertions based on different geographical locations of users that make the assertions. This for example may show geographical areas, such as states that predominantly do not believe in global warming. Embodiments of the website may also display the assertions associated with one or more subject with respect to locations of the users over a defined time period to display how the assertions have changed over time. For example a map of the United States may be displayed from 1990 to 2010 that shows locations assertions as a movie, to show how an assertion has changed over time and if desired, per location. The same location/time displays may also be shown with associations of subjects, for example to display how an association of subjects changes per location or per time or both per location and over time. Embodiments of the website may also determine a percentage of the users that agree with an assertion associated with one or more of the subjects, and display this in any manner, for example numerically, graphically or over time. Embodiments of the website may also display of an assertion in a first format to indicate that the assertion has been proven true and display the assertion in a second format to indicate that the assertion has been proven false. The system may display information without regards for geographical or temporal data or in any combination as desired for the particular implementation.

Embodiments of the website may be configured to accept references to the documents and/or users or non-users or other entities or any combination thereof and command the server computer to store the documents or the references to the documents, or users or non-users or other entities in the database. The same holds for subjects, associations, assertions, and opinions for example. Embodiments of the website may interact with users to accept payment for use of the database and also to accept a login from users via their social network sites.

First order logic is a formal logical system that is also known as predicate logic. This system enables reasoning about objects through use of formal syntax that defines formulas, predicates, quantifiers, terms, literals, etc., for example as briefly described below.

Formulas

A formula is a logical expression that may either be true or false depending on the values assigned to the variables it contains. If we can show that a formula is true for every possible assignment of variables, then the formula is proved. If it is always false it is disproved. If it is sometimes true and sometimes false, then depending on the context, the formula is invalid or satisfiable.

In first order logic there are three types of formulas:
Formula Quantifiers—introduces a variable:
$\forall x \ldots$ (for all x . . . ), $\exists x \ldots$ (there exists x . . . )
Formula Combination: $\neg, \hat{}, \vee, \Rightarrow, \Leftrightarrow$
Predicate—an atomic predicate applied to a certain number of terms: p(t1; t2; . . . ). The number of terms is fixed for any given predicate, and is called the predicate's arity.

For example, the atomic predicate B (for bird), when applied to an Eagle, is a formula whose value is $\bot$ (true). When it is applied to a Cat, it is a formula whose value is $\bot$ (false):

$\forall x \cdot E(x) \Rightarrow B(x)$ All Eagles are birds (T)
$\forall x \cdot B(x) \Rightarrow E(x)$ All birds are Eagles ($\bot$)
$\exists x \cdot B(x) \Rightarrow E(x)$ Some bird is an Eagle (T)
$\forall x \cdot C(x) \Rightarrow B(x)$ All Cats are birds ($\bot$)
$\exists x \cdot C(x) \Rightarrow B(x)$ Some Cat is a bird ($\bot$)

Here, E, B, and C are atomic predicates, and when the argument x is applied they become a formula, which may be true or false depending on the value of x. The quantifier $\forall x$ signifies that the following argument is true for whatever thing we choose to substitute for x—whether it is an Eagle, a cat, a car, or a galaxy. The remainder of the equation $E(x) \Rightarrow B(x)$ says if x satisfies the predicate E (it is an Eagle), it must also satisfy the predicate B (it is a Bird). Similarly, $\exists x$ says There is at least one thing out there in the universe which, when substituted for x, makes the following true. Note that time can become a consideration in evaluating these formulas: if I is the set of Ivory Billed Woodpeckers, the evidence seems to point to $\exists x: I(x)$ being $\bot$, although it was certainly true at the beginning of the 20th century.

Terms

The formulas we create represent reasoning about sets, and a predicate is a formula which assigns a truth value to an element depending on whether it is an element of the set corresponding to that predicate. The part of a formula that represents a set element is called a term, and there are two kinds of terms:

a variable (such as x in the example above) is a term,
an atomic function when applied to zero or more terms results in a term (the example above doesn't include any atomic functions, only atomic predicates. One important case is the constant, an atomic function that takes no arguments.)

The value of a variable is usually characterized by an enclosing quantifier.

In logic, the names given to atomic predicates and atomic functions are called literals, and in embodiments of the system both may be represented using the same mechanism. If a predicate is used as a function, its value is the set of elements for which the predicate is true. Note that this means that for any given atomic predicate, the corresponding atomic function takes one argument fewer. If the atomic predicate S is true only when applied to Socrates, there is a corresponding atomic function S' which takes zero arguments and whose value is Socrates. Thus, S(S') is true.

Literals

In known descriptions of first order logic, no particular structure is assigned to atomic predicates and functions, they are typically represented by letters:

$\forall x \cdot S(x) \Rightarrow H(x)$ Socrates is a Human
$\forall x \cdot H(x) \Rightarrow M(x)$ All Humans are Mortal
$\therefore \forall x \cdot S(x) \Rightarrow M(x)$ therefore, Socrates is Mortal This is a syllogism taken from the Aristotle's Organon, a six volume work on logic. This syllogism is a proof that Socrates is mortal—if the first two lines of the syllogism are accepted, then logic dictates that the third is accepted. Embodiments of the system include a theorem analyzer that verifies groups of assertions, or theorems. In this case, the theorem is true regardless of what particular meaning is assigned to the literals S, H, and M.

Subjects, and a System Overview

Embodiments of the system represent atomic predicates and atomic functions, which are used to represent literals in first order logic. The system provides for storage, retrieval and display of atomic predicates to implement and support a shared database of first order logic formulas. As stated, the term literal is used in logic to describe the sets about which the system enables reasoning. In the example above, the letter S represents the singleton set containing Socrates, H represents the set of all humans, and M represents the set of all mortals. The term literal conveys the role these objects play in logical formulas, wherein embodiments of the system enable the association of one literal to be the same as or different from another, wherein the actual meaning is irrelevant. As utilized herein, the terminology for the same objects is subjects, which is used to convey the idea of something that the system is assigning a name to represent. The word ontology as utilized herein is intended to literally mean categories of being.

System Elements and Notation

Embodiments of the system enable a mechanism to represent an evolving set of categories while allowing multiple users to tailor their own view of those categories according to their beliefs. Embodiments of the system may be implemented with three general elements:

A table of users, each of which may be assigned a sequence number. I.e., U1, U2 and so on to reference different users.

A database of first order logic formulas, or assertions, which may be assigned sequence numbers, referenced A1, A2, etc. Each assertion may also be tagged with an identifier of the user who authored them, the time at which they were created and optionally the location of the user who authored them. This enables geographical and temporal displays of assertions, i.e., how assertions change over time, for example as plotted on a map and displayed as a movie.

A set of subject identifiers or subject ids, which may be assigned a sequence number. These are referenced similarly using S1, S2 etc., herein.

These subject ids serve as literals in the assertions. Their meaning is determined by the examining other assertions contained in the database according to rules described below.

Special Assertion Types

Four types of assertions with a specific form are given special treatment

Definition assertions—Assertions of the form $\forall x:S1(x) \Rightarrow$ (some descriptive text). This assertion signifies that text describes the elements of the subject set. The system makes no attempt to understand the meaning of the description, it is only displayed by the system for the use of the users of the system. By viewing the set of descriptions assigned to an identifier as displayed by one or more embodiments of the system, the user can create an interpretation of that subject identifier in his or her mind.

Belief assertions—Assertions of the form I (the author of this assertion) accept/reject/have no opinion about A1. Belief assertions are used to personalize each user's view of the data in the database by displaying data different based on each user's beliefs about the assertions. These assertions are created using a type of atomic predicate that takes three arguments:

Believers(User, Believes/Disbelieves/HasNoOpinion, Assertion)

which is true if the user has the given belief about the assertion.

Equivalence assertions—Assertions of the form $\forall x:S1(x) \Rightarrow S2(x)$. If it is discovered or believed by a particular user that $S1(x) \Leftrightarrow S2(x)$ and $S2(x) \Rightarrow S1(x)$ then by definition, S1 and S2 must be represent the exact same set. This can also be written $\forall x:S1(x), S2(x)$. Embodiments of the system may build a graph of the database based on these subject equivalence assertions, and from that build a function that maps each subject identifier to a set of subject identifiers that are termed the strongly connected component of the graph that contains that identifier. A subject is implemented in one or more embodiments of the system as this set of subject identifiers. Note that formulas generally can only reference a single subject identifier, but in operation that subject identifier may be expanded to include all the identifiers in the subject. The set of identifiers that constitute a subject may thus be referred to as a subject equivalence set. Embodiments of the system thus enable dynamic ontology that allows for each user to be presented with a different view of the assertions based on the associations of subjects that they consider equivalent. This is unknown in the art where hardcoded ontology implementations are the norm.

Argument assertions—all assertions that do not fall into the other three categories, these constitute the logical argument that users are constructing. These assertions are passed to the theorem analyzer in one or more embodiments of the system. The theorem analyzer classifies assertions as either proved (always true), disproved (always false) inconsistent (may be true or false depending on the variable assignment.)

The Ontology Mechanism

Given the definition of these four assertion types, embodiments of the system enable a personalized ontology view of the data. For example, one or more embodiments of the system use each user's belief assertions to display a customized view of the database, i.e., the belief assertions are utilized to filter the other assertions in the database. Subject and equivalence assertions that the user rejects are ignored. Argument assertions that the user rejects are negated before being passed to the theorem analyzer. After filtering the database using the belief assertions, the subject equivalence sets are computed for any subject identifiers that the system is to display for a user. While the formulas reference individual subject identifiers, in operation those identifiers may be expanded to include the set of identifiers the user considers equivalent. Thus embodiments of the system enable different users to create subject identifiers with the same meaning and then add reasoning using those different subject identifiers. When those subject identifiers are marked as equivalent for the particular user, the logic formulas involving those two identifiers are merged by the system, and the possibility arises that the theorem analyzer may find inconsistencies between those two sets of formulas. The system then collects and merges the description assertions for each subject, and from these the system creates descriptive representations of the literals in order to display the formulas. Although these descriptions have no meaning to the theorem analyzer, this does not mean that the descriptions do not mean anything to the users. The collected descriptions of a subject should convey as unambiguous a definition of the subject as possible. For example, users of the system typically initially create simple descriptions and through a series of refinements and mergers with other subject identifiers create descriptions that become more and more specific. One might create a description such as "the president", but over time, depending on the context, it might be augmented with descriptions specifying which country's president is being discussed (or perhaps some corporation's president), the name of the specific president, or perhaps the discussion is actually about the office of the presidency without reference to a specific occupant. Over time, a dictionary of subjects is developed. The subjects evolve through this disambiguation process, and users may find and access these subjects and descriptions via the search mechanism, for example when creating new assertions.

To understand the description mechanism better, suppose a user has attached the description "Fruit" to S1. The user then add more logic concerning strawberries, apples, bananas and so on, all of which satisfy $S1(x)$. One day, however, the user learns that there are two senses to the word "Fruit": A botanical sense, and a culinary sense. The user realizes that all of the user's reasoning about S1 has been the culinary sense of "Fruit", i.e., "fleshy seed associated structures of certain plants that are sweet and edible in the raw state". The botanical definition may be "a part of a flowering plant that derives from specific tissues of the flower, mainly one or more ovaries". The user also discovers that other users have already created subject identifiers for these sets:

$\forall x: S1(x) \Rightarrow$ Culinary Fruit (Author U1)
$\forall x: S1(x) \Rightarrow$ Fruit (Author U1)
$\forall x: S2(x) \Rightarrow$ Botanical Fruit (Author U2)
$\forall x: S2(x) \Rightarrow$ Fruit (Author U2)

Note that the descriptions of these subjects include both "Fruit", "Culinary Fruit" and "Botanical Fruit". This is not an ambiguity, it is merely a recognition that users abbreviate and depend on context when discussing a subject. When a user is deciding what a subject means the system enables the user to look at other descriptions, and the meaning that the user assigns should be consistent with the other descriptions. Because the user actually meant when defining S1 was culinary fruit, the user can now add an equivalence assertion between S1 and S2:

$\forall x:S1(x), S2(x)$

For this particular user, U1, the system merges S1 with S2 and includes both definitions, "Fruit" and "Culinary Fruit" (and another "Fruit" from S2.) All the reasoning about S2 that U2 and others have entered will also be applied to S1 in this particular user's view, so the user will have a richer knowledge base to work with. In one or more embodiments of the system, new assertions are accepted by default for other users, i.e., U2 and others also see a merger of S1 and S2 unless they specifically reject the equivalence. User U2 now views fruit with culinary reasoning is suddenly merged with the botanical reasoning attached to S2. All of the reasoning that depends on sweetness and edibility when raw is suddenly invalid, and contradictions arise. User U2 now has three choices, revise the reasoning so that fruit does not depend on the properties of sweetness and raw edibility, mark the equivalence as rejected, or perhaps a combination of both. Since the user may not understand the distinction, it might be that some of the reasoning should be applied to both botanical fruit and to culinary fruit. Some effort might be required to sort out which of the user's assertions applied to which subjects.

Now, suppose U2 views the fruit subject and the associated reasoning, rejects the equivalence and adds an equivalence between S1 and another new subject to help clarify the differences. In this case, user U2 will determine which meaning is closer to the user's desired meaning, and then hide or reject the assertions that used the less appropriate subject. It is common that disagreements arise from this type of terminological issue. For example, it is not surprising that confusion results when no clear distinction is made between terms like "climate change", "global warming", and "anthropogenic global warming".

This mechanism can also be applied to equivalences which are genuinely in dispute. Captain Charles Johnson is the British author of the 1724 book A General History of the Robberies and Murders of the most notorious Pyrates, though his identity remains a mystery. No record of a captain by this name exists. Some scholars have suggested that Charles Johnson was actually Daniel Defoe writing under a pen name, but this is disputed. Here is a set of assertions that describe this situation:

A9: $\forall x \cdot S5(x) \Rightarrow$ Description["Captain Charles Johnson"](x)
A10: $\forall x \cdot S6(x) \Rightarrow$ Description["Daniel Defoe"](x)
A11: $\forall x \cdot S5(x) \Rightarrow S6(x)$
A12: $\forall x \cdot S6(x) \Rightarrow S5(x)$ If a user does not reject A11 and A12, the subjects will appear merged when the user examines the database. Any formulas that apply to Captain Johnson will also be applied by the system to Daniel Defoe. If there were contradictory information about the two of them, e.g. Captain Johnson and Daniel Defoe were known to be in two different places at the same time, then a theorem could be developed that contradicted a user's belief in the equivalence of S5 and S6, and the system flags these beliefs as inconsistent. Then the user should resolve this inconsistency, either by rejecting the equivalence, or rejecting the assertion that they were in two different places at the same time. Presumably this last fact was proved using other assertions that would also have to be rejected.

BRIEF DESCRIPTION OF THE DRAWINGS

The above and other aspects, features and advantages of the invention will be more apparent from the following more particular description thereof, presented in conjunction with the following drawings wherein:

FIG. 5B illustrates a comment section for example that may be displayed by the system beneath the viewable area shown in FIG. 5A for example. FIG. 5C illustrates a related assertion section for example that may be displayed by the system beneath the viewable area shown in FIG. 5B for example.

FIG. 7 illustrates a specific subject, namely the subject related to Global Warming along with description, comments and related information sections.

FIG. 8 illustrates a list of assertions in the database that multiple users may utilize to develop their own personalized view of the subjects.

FIG. 9 illustrates a specific assertion, namely the Anthropogenic Global Warming assertion and related comments and assertions.

FIG. 10 illustrates a theorem regarding Aristotle's Organon with no related assertions.

FIG. 11 illustrates a theorem regarding Global Warming with related assertions.

DETAILED DESCRIPTION

A collaborative first order logic system with dynamic ontology will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
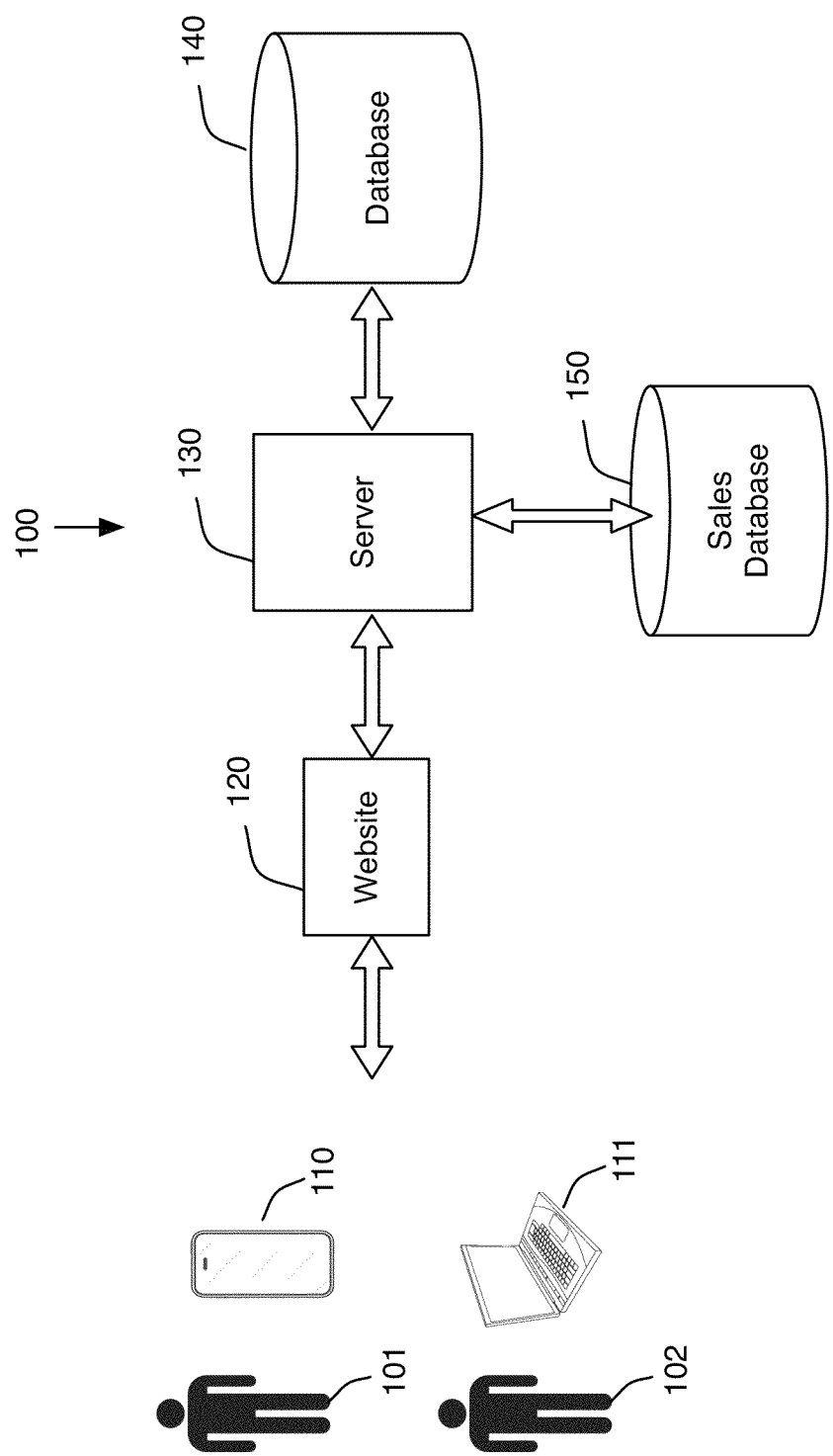
FIG. 1 illustrates a system architectural view of a collaborative first order logic system with dynamic ontology.

FIG. 1 illustrates a system architectural view of collaborative first order logic system with dynamic ontology 100. One or more embodiments of the system are implemented with server computer 130, database 140 (and optionally a sales database 150) and optionally a website or an application 120 that enables discussion among large numbers of users 101 and 102 in the language of first order logic. One or more embodiments may utilize also computers coupled with the server computer in any manner to implement an application that provides a non-HTML based application interface as one skilled in the art will appreciate. For ease of discussion all references to a website including the claims are intended to signify a website or an equivalent standalone application for execution on a computer for example. In one or more embodiments of the system, multiple users 101 and 102, etc., are provided with access to data in database 140 via the website (or application), for example that executes on computers 110 and/or 111. The website displays the data which includes documents, subjects associated with the documents, associations between the subjects, assertions associated with the subjects and opinions regarding the assertions. In one or more embodiments, the website accepts input from the users to alter the associations between the subjects. The website commands the server computer to alter the associations between the subjects in the database. This ability provided by one or more embodiments of the system increases the effectiveness of the system by providing a flexible solution the ontology problem, i.e., the problem of naming the elements or subjects that the system enables reasoning about and which may be called different things by different people or groups of people. One or more embodiments of server 130 or website 120 or computers 110 or 111 or any combination thereof may be implemented to utilize a natural language interface to query the user for logical inputs so that users do not need to understand the syntax of first order logic equations. For example, the system may query a user to obtain input to questions such as "Do you believe Socrates is a man?" and based on the response accepted by the system from the user, the system may create an assertion in first order logic syntax that is stored in database 140 without requiring the user to input first order logic symbols. The system may also utilize natural language processing to resolve grammatical issues regarding questions to ask, for example by querying an advanced user as to whether the grammar for asking a natural language question is correct for a given first order logic assertion.

Figure 2:
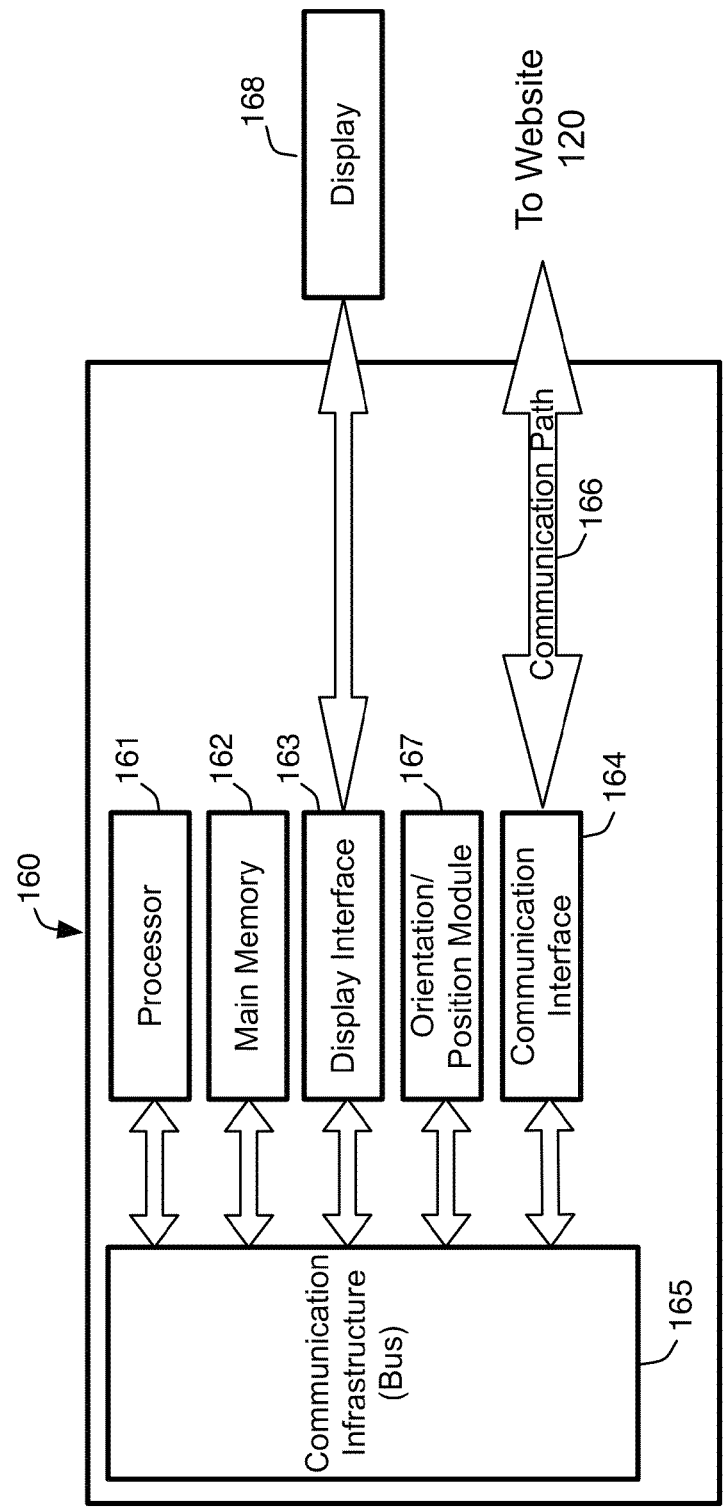
FIG. 2 illustrates a hardware architectural view of a computer processor utilized in an embodiment of the system.

FIG. 2 illustrates a hardware architectural view of a computer processor utilized in an embodiment of the system. Computer 160 includes processor 161 that executes software modules, or "apps", generally stored as computer program instructions within main memory 162. Display interface 163 drives a visual display 168 of any computer shown in FIG. 1. Optional orientation/position module 167 may include a North/South or up/down orientation chip or both. Communication interface 164 may include wireless or wired communications hardware protocol chips. In one or more embodiments of the invention communication interface may include telephonic and/or data communications hardware. In one or more embodiments communication interface 164 may include a Wi-Fi™ and/or BLUETOOTH® wireless communications interface. BLUETOOTH® class 1 devices have a range of approximately 100 meters, class 2 devices have a range of approximately 10 meters. Any wireless network protocol or type may be utilized in embodiments of the invention. Processor 161, main memory 162, display interface 163, communication interface 164 and orientation/position module 167 may communicate with one another over communication infrastructure 165, which is commonly known as a "bus". Communications path 166 may include wired or wireless medium that allows for communication with other wired or wireless devices.

In one or more embodiments website 120 is configured to accept an opinion from a first user related to an assertion associated with one or more subjects wherein the assertion is made by another user. This allows user-dependent views of the first order logic. By so doing, embodiments of the system enable a dynamic ontology system that enables similar subjects to be grouped together when they mean the same thing to a particular user. Hence, the system is not hard coded to a given static ontology, but rather can change over time and per user, which is unknown in the art. The system provides for domain knowledge that may not be fully understood, and may change over time and also provides for agreement and disagreement between users based on the subjects and their similarity or equivalence for example. The system thus provides for a dynamic ontology that allows for open and dynamic subject associations, which greatly increases the usefulness of the system.

Figure 3:
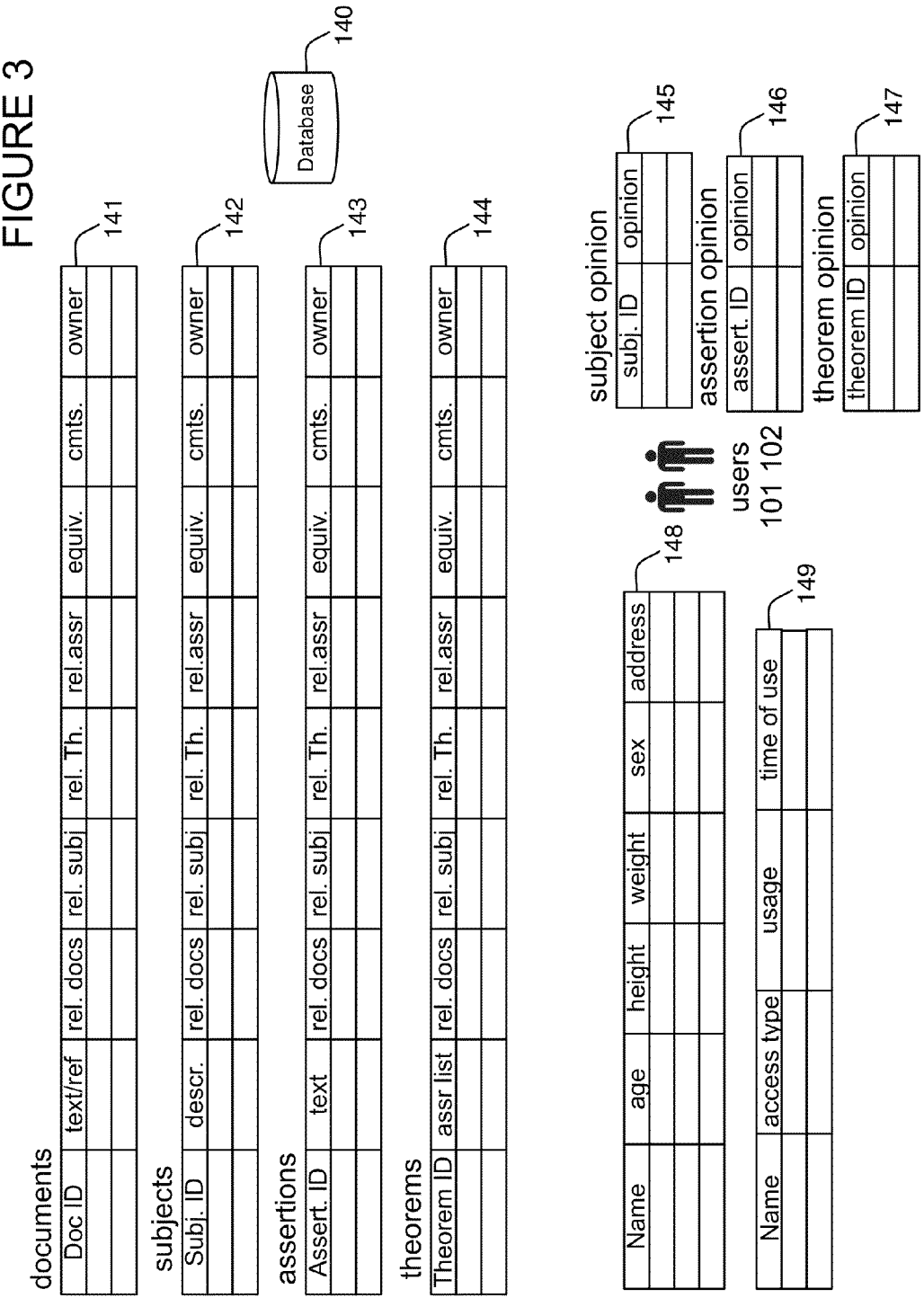
FIG. 3 illustrates a database schema utilized in an embodiment of the system.

FIG. 3 illustrates a database schema utilized in an embodiment of the system. As shown, tables for documents 141, subjects 142, assertions 143 and theorems 144 provide the system with the ability to store information related to these objects in database 140. The fields may be modified for the intended implementation as one skilled in the art will appreciate and the schema as all other descriptions herein are exemplary in nature and not limiting in any sense. Document table 141 may include a text field, or a reference to text, for example a hyperlink. Theorem table 144 may include an assertion list, or reference to a list held in another table indexed by the theorem identifier field for example. Embodiments of these four tables also include related documents, related subjects, related theorems, related assertions, equivalence assertions, comments and an owner field as shown. The theorems for example provide a line of reasoning associated with the assertions. Users 101 and 102 along with all other users for example have opinions stored in subject opinion table 145, assertion opinion table 146 and theorem opinion table 147 for example. The system may also store demographic information related to users 101 and 102 in user table 148, for example that many include an address for geographic based displays of assertions. In addition, database 140 or optionally sales database 150 may include fields such as access type, usage and time of use in sales table 149. Embodiments of the website may interact with users to accept payment for use of the database and also to accept a login from users via their social network sites. Other embodiments of the invention may be implemented in any other manner that enables the system to perform as described herein. For example, opinions may be stored as assertions about the belief about other assertions for example. Any other type of technology may also be utilized to store information so long as the information is accessible from the computers shown in FIG. 1.

One or more embodiments of the website or application provide a theorem analyzer that automatically finds any logical contradictions for example. One or more embodiments of the server computer are configured to analyze the assertions and display any logical contradictions with the theorems. Other embodiments include data in the database related to opinions regarding the associations between the subjects wherein the website is configured to display the opinions regarding the associations between the subjects and accept an opinion from a user related to an association between one or more subjects wherein the association is made by another user. This allows for per-user views of the associations in the system, as per table 149, which is unknown in the art since known first order logic systems employ a static ontology. Embodiments of the theorem analyzer may run on a computer associated with website 120 or in any computer in the system in a distributed manner if desired. One or more embodiments of the theorem analyzer and/or any other components or elements of the system may operate on formulas having unique identifiers for subjects for example wherein the association logic is applied on a per user basis after processing the formula. This for example simplifies internal processing for personalized views of the system without requiring large numbers of similar formulas with substituted associations to be stored in the system, and altered when opinions or assertions change per user.

Figure 4:
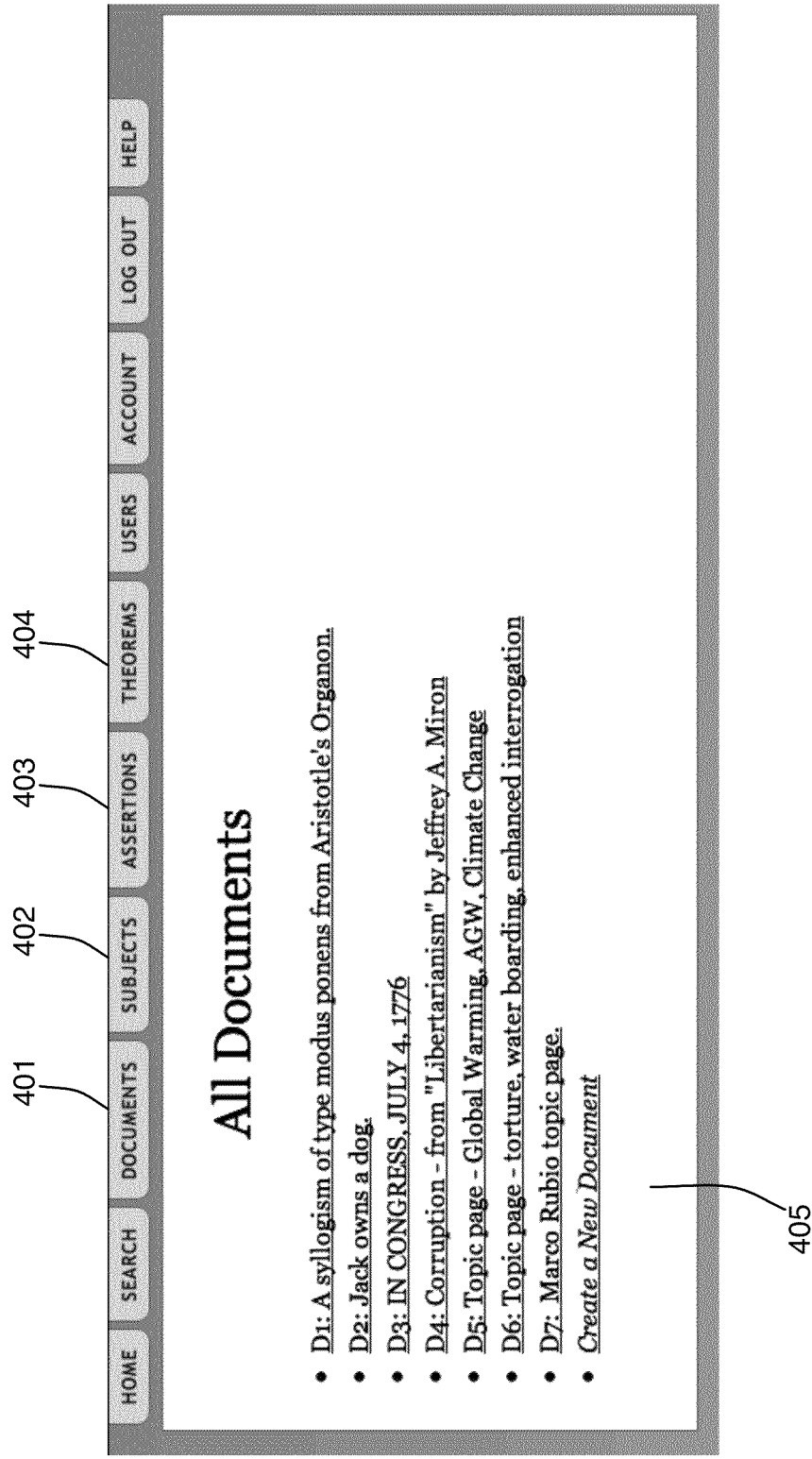
FIG. 4 illustrates a display generated by an embodiment of the system from a website or an application for example that enables the system to accept input from users to search for and display documents, display subjects, display assertions, display theorems and perform administrative functions. The other illustrations listed below may for example be hypertext or application based displays as one skilled in the art will recognize.

FIG. 4 illustrates a display generated by an embodiment of the system from a website or an application for example that enables the system to accept input from users to search for and display documents 401, display subjects 402, display assertions 403, display theorems 404 and perform administrative functions. For example when asserting the display documents tab, document list 405 is displayed. The other illustrations listed below may for example be hypertext or application based displays as one skilled in the art will recognize.

Figure 5A:
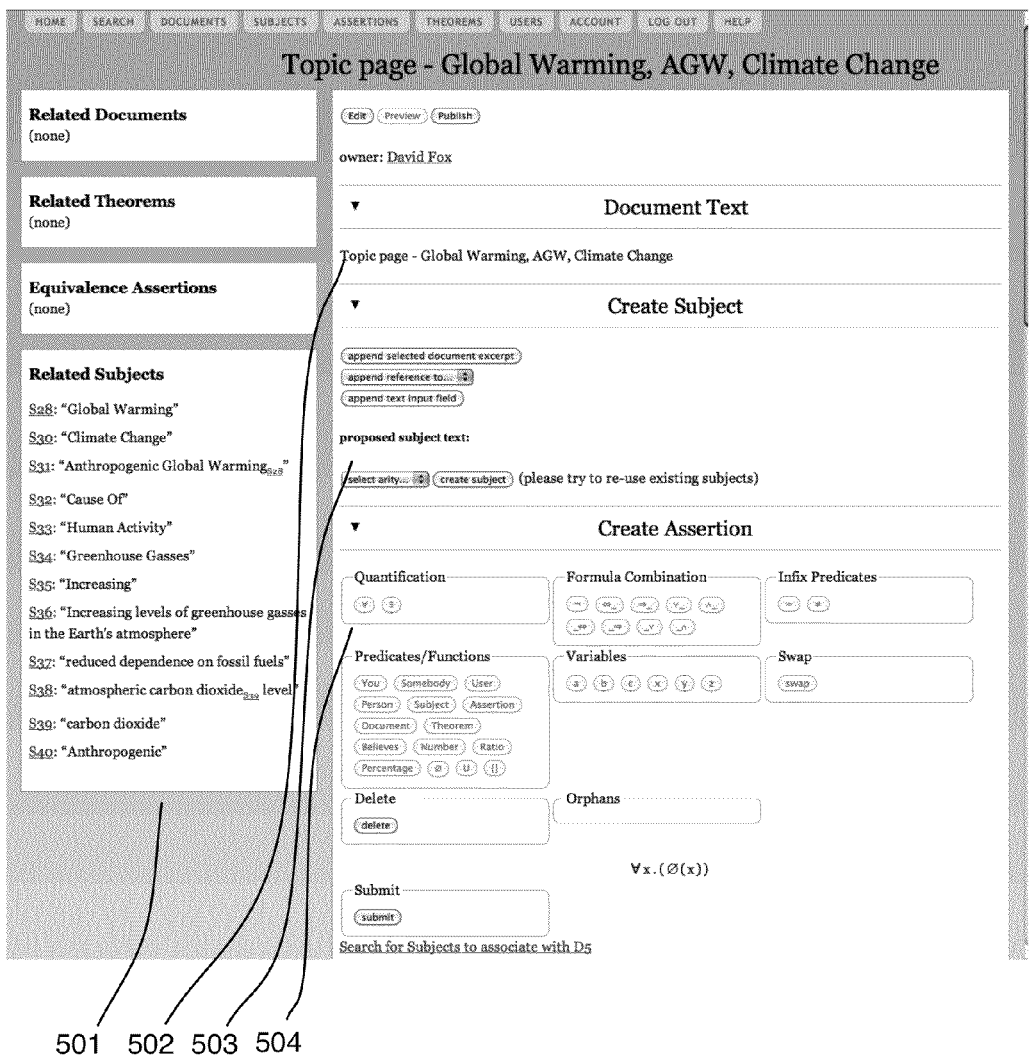
FIG. 5A illustrates a document or topic that is displayed by the system when a user selects one of the documents shown in FIG. 4 for example.

FIG. 5A illustrates a document or topic that is displayed by the system when a user selects one of the documents shown in FIG. 4 for example. As shown the related document, theorems, equivalence assertions and subjects are shown in area 501. The document text may be shown in area 502, a create subject text area is used to create subjects as per area 503 and assertions are created with assertion editor 504 that allows for entry and edit of first order logic elements. FIG. 5B illustrates a comment section for example that may be displayed by the system beneath the viewable area shown in FIG. 5A for example. FIG. 5C illustrates a related assertion section for example that may be displayed by the system beneath the viewable area shown in FIG. 5B for example.

Figure 6:
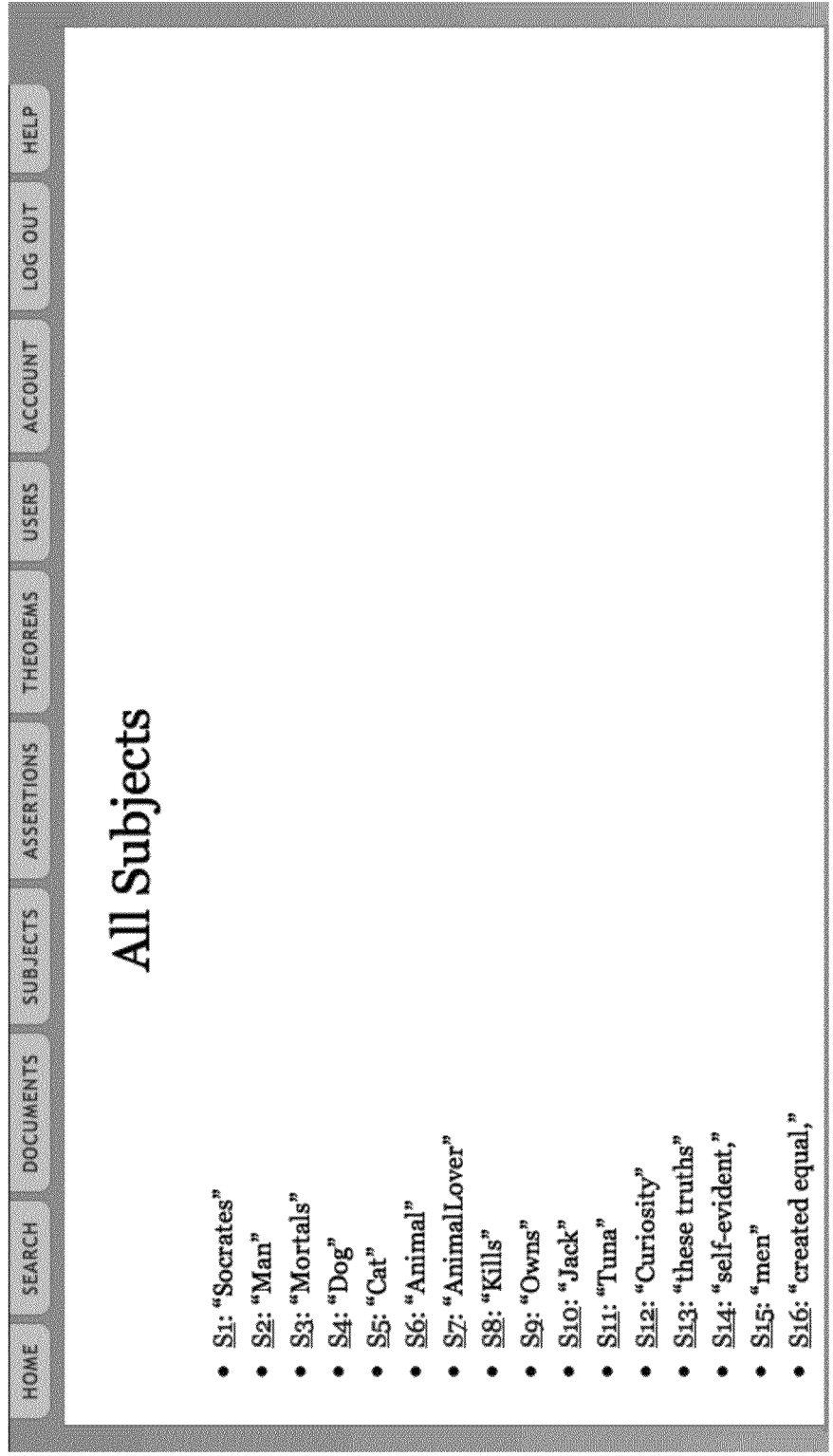
FIG. 6 illustrates a list of the subjects in the database that multiple users may utilize in their assertions, associations and theorems.

FIG. 6 illustrates a list of the subjects in the database that multiple users may utilize in their assertions, associations and theorems. Selecting a subject in the list shows that desired subject as per FIG. 7.

Figure 7:
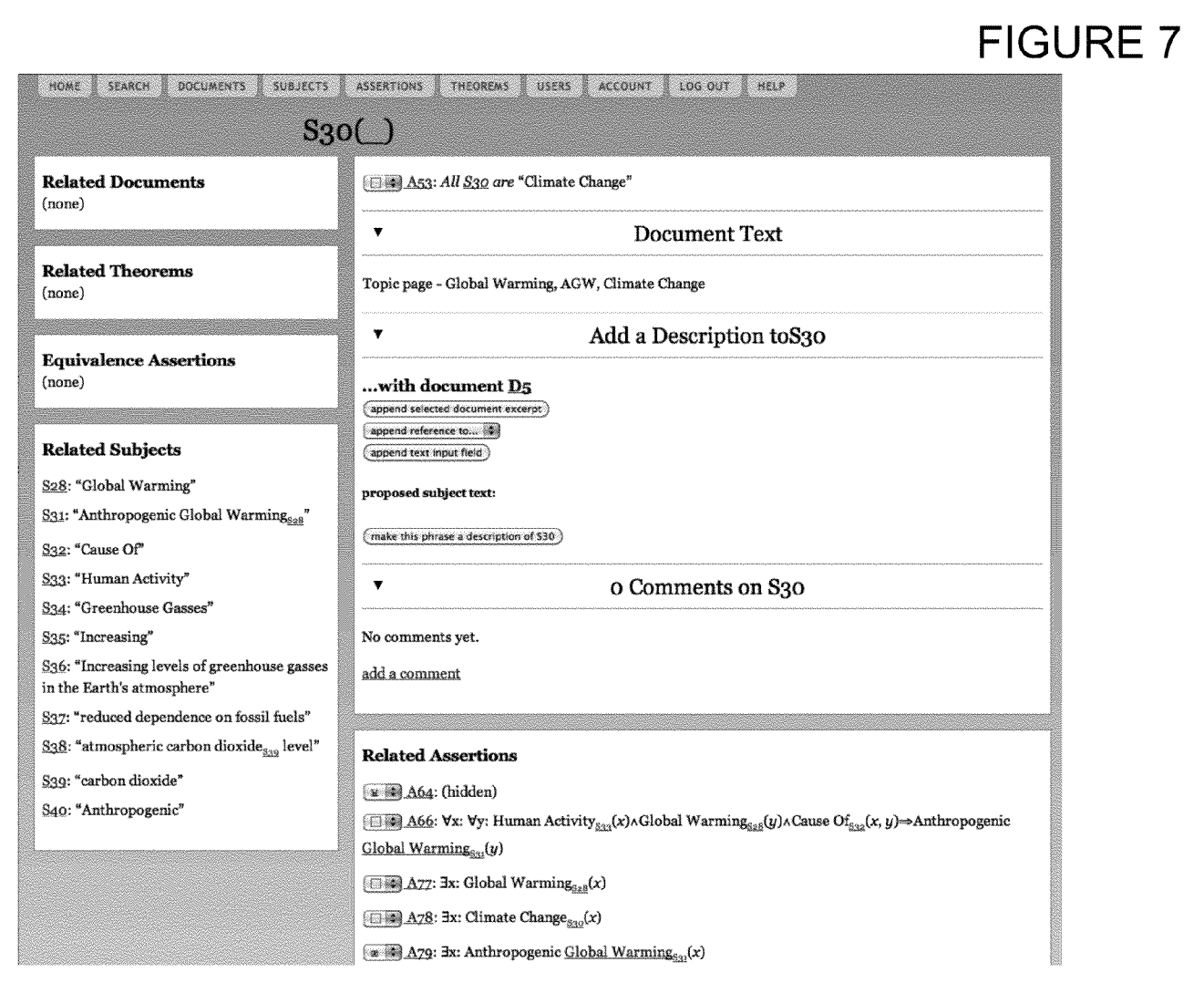

FIG. 7 illustrates a specific subject, namely the subject related to Global Warming along with description, comments and related information sections. As shown the opinions for each assertion along with an opinion for the subject may be displayed as a selection box that allows for agreement or non-agreement for example. This enables personalized views of the data in the system based on the user's agreement or disagreement of equivalences and assertions for example.

FIG. 8 illustrates a list of assertions in the database that multiple users may utilize to develop their own personalized view of the subjects. Selecting an assertion in the list shows that desired assertion as per FIG. 9.

Figure 9:
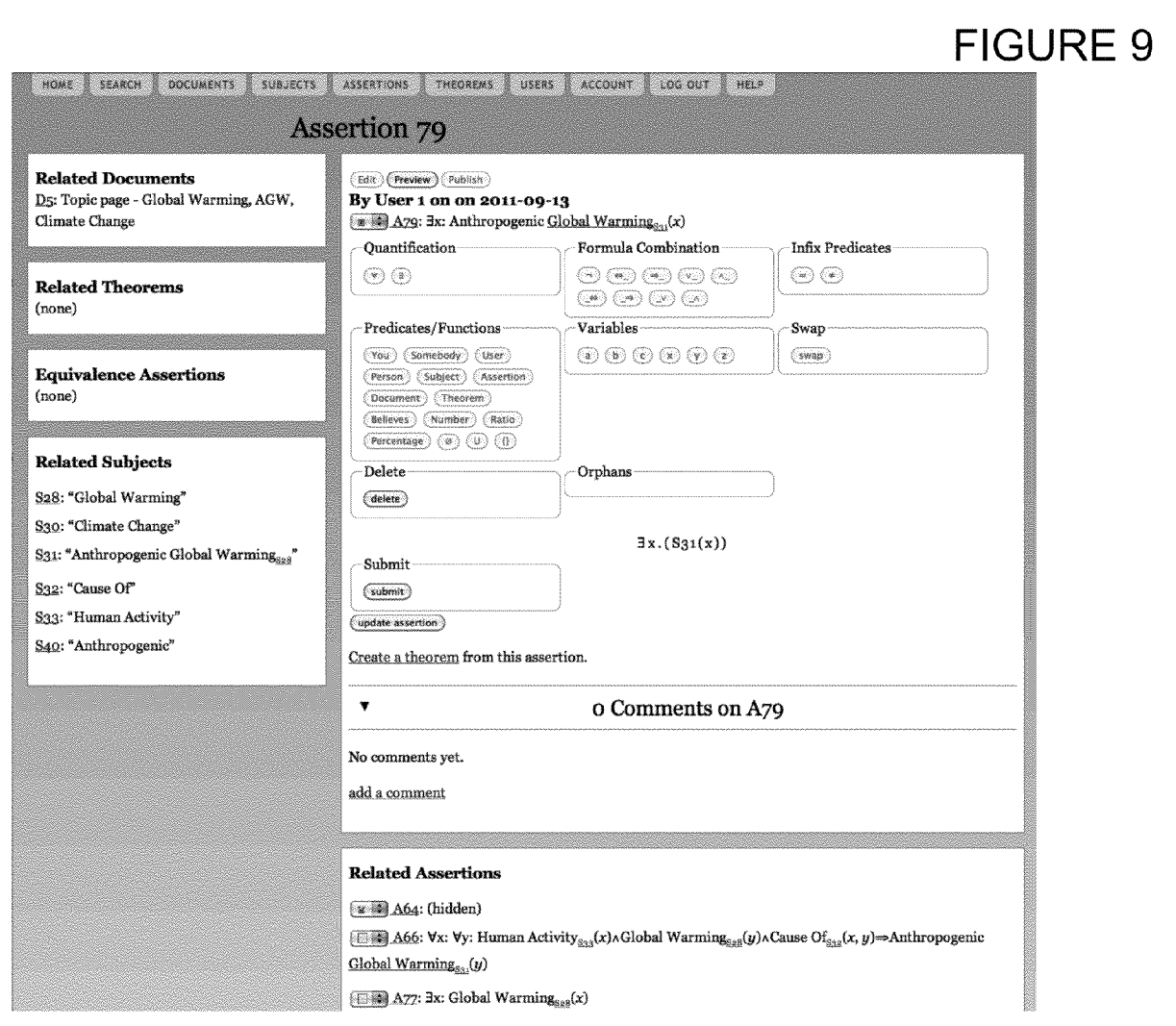

FIG. 9 illustrates a specific assertion, namely the Anthropogenic Global Warming assertion and related comments and assertions. As shown, the assertion was owned or created by a user on a particular date in the top right portion of the window. This allows for temporal based displays (see FIG. 13 that may play as a movie over a desired time period). The assertion window enables a user to also create a theorem based on the assertion and shows related documents, theorems, assertions, subjects and equivalence assertions.

FIG. 10 illustrates a theorem regarding Aristotle's Organon with no related assertions. This shows opinions for each of the assertions as selectable option boxes to the left of the assertion formulas in the upper right portion of the screen.

FIG. 11 illustrates a theorem regarding Global Warming with related assertions. By selecting one of the related assertions, the assertion editor screen for that assertion may be displayed by the system.

Figure 12:
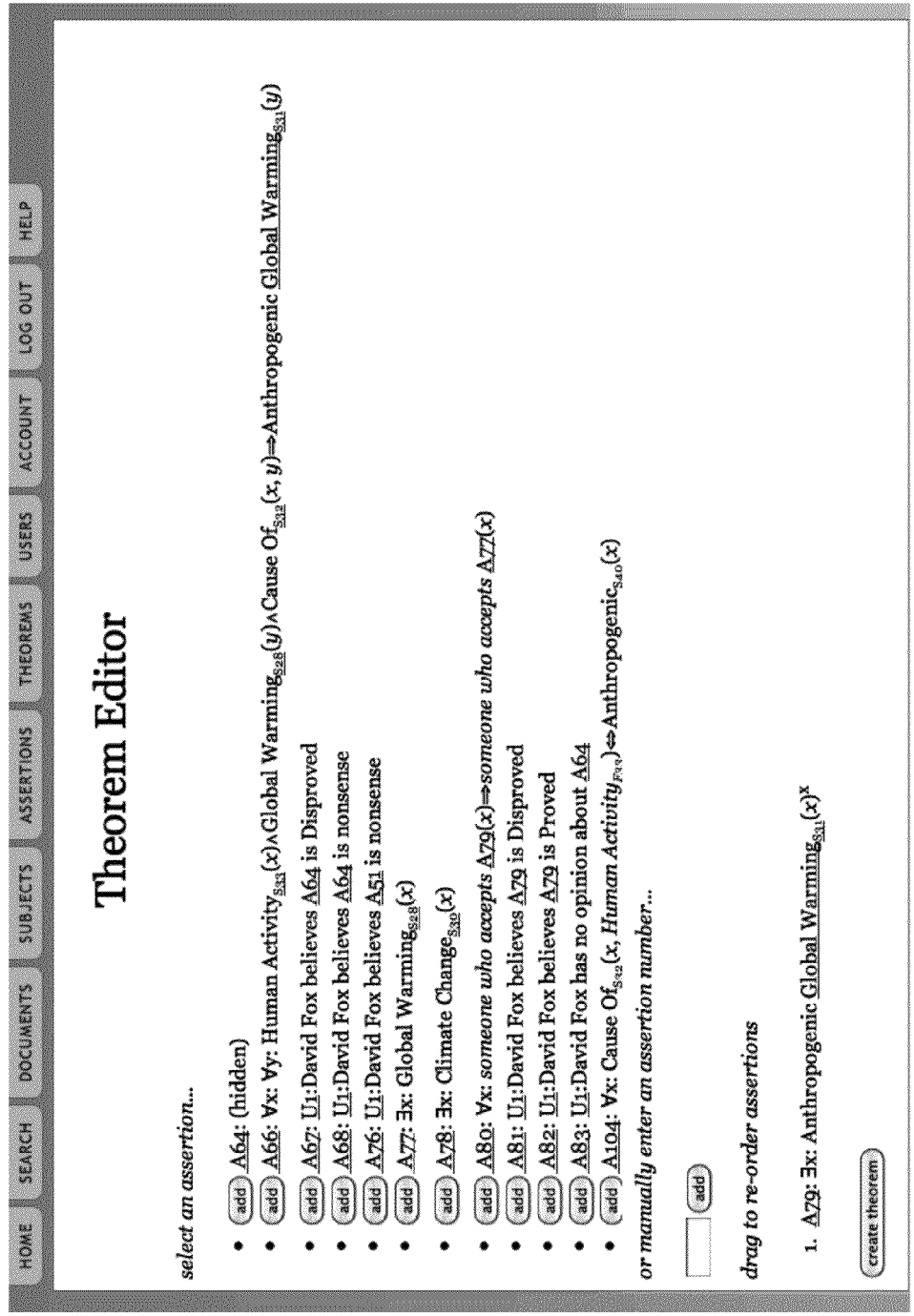
FIG. 12 illustrates a theorem editor that enables adding assertions, reordering assertions and creating a theorem.

FIG. 12 illustrates a theorem editor that enables adding assertions, reordering assertions and creating a theorem. Embodiments of the system run the theorem analyzer when the "create theorem" button is asserted by a user.

Figure 13:
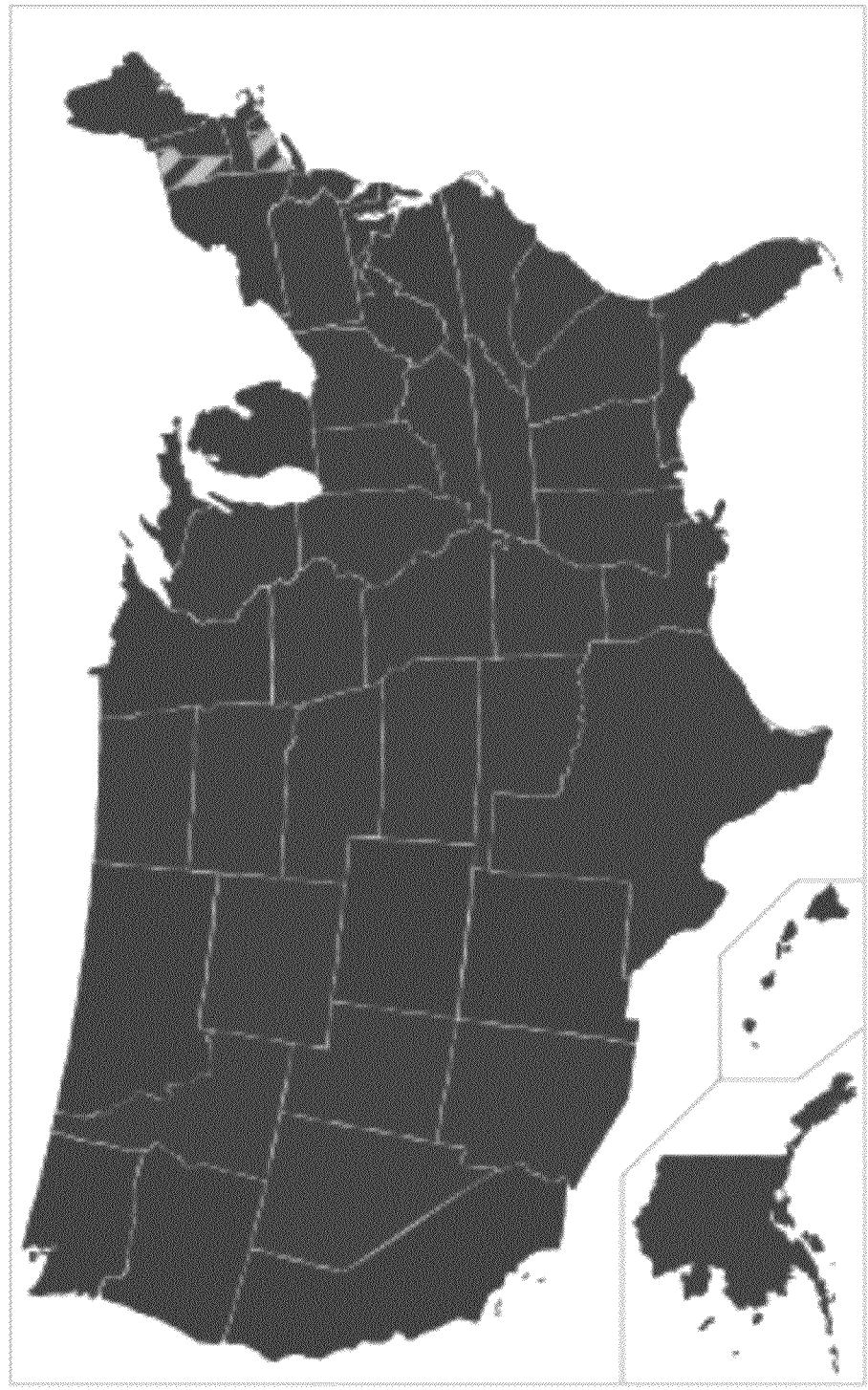
FIG. 13 illustrates a geographical display of assertions related to Global Warming based on the locations of users that believe Global Warming is true (Blue) or false (Red).

FIG. 13 illustrates a geographical display of assertions related to Global Warming based on the locations of users that believe Global Warming is true (Blue) or false (Red). Thus, embodiments of the website may display a map of the assertions with respect to locations of the users that made the assertions. This allows for maps of assertions to be displayed that show for example different assertions based on different geographical locations of users that make the assertions. This for example may show geographical areas, such as states that predominantly do not believe in global warming. Embodiments of the website may also display the assertions associated with one or more subject with respect to locations of the users over a defined time period to display how the assertions have changed over time. For example a map of the United States may be displayed from 1990 to 2010 that shows locations assertions as a movie, to show how an assertion has changed over time and if desired, per location. The same location/time displays may also be shown with associations of subjects, for example to display how an association of subjects changes per location or per time or both per location and over time. Embodiments of the website may also determine a percentage of the users that agree with an assertion associated with one or more of the subjects, and display this in any manner, for example numerically, graphically or over time. Embodiments of the website may also display of an assertion in a first format to indicate that the assertion has been proven true and display the assertion in a second format to indicate that the assertion has been proven false.

While the invention herein disclosed has been described by means of specific embodiments and applications thereof, numerous modifications and variations could be made thereto by those skilled in the art without departing from the scope of the invention set forth in the claims.

What is claimed is:

1. A collaborative first order logic system with dynamic ontology comprising:
    a server computer;
    a database coupled with said server and configured to store information related to
        documents;
        subjects associated with said documents;
        associations between said subjects;
        assertions associated with said subjects;
        opinions regarding said assertions;
        theorems associated with said assertions;
    a website coupled with said server computer wherein said website is configured to
        display said documents;
        display said subjects associated with said documents;
        display said associations between said subjects;
        display said assertions associated with said subjects;
        display said opinions regarding said assertions;
        accept input from a plurality of users including a first user and a second user to alter said associations between said subjects;
        command said server computer to alter said associations between said subjects in said database;
    accept an opinion from said first user related to said assertion associated with one or more subjects wherein said assertion is made by said second user; and,
    wherein said server computer is configured to analyze said assertions and display any logical contradictions with said theorems.

2. The collaborative first order logic system with dynamic ontology of claim 1
    wherein
    said database is configured to store information related to
        opinions regarding said associations between said subjects;
    said website is configured to
        display said opinions regarding said associations between said subjects;

accept an opinion from said first user related to an association between one or more subjects
wherein said association is made by said first user or said second user.

3. The collaborative first order logic system with dynamic ontology of claim 1
wherein
said website is configured to
display a map of said assertions associated with one or more subject with respect to locations of said plurality of users that made said assertions.

4. The collaborative first order logic system with dynamic ontology of claim 1
wherein
said website is configured to
display said assertions associated with one or more subject with respect to locations of said plurality of users over a defined time period to display how said assertions have changed over time.

5. The collaborative first order logic system with dynamic ontology of claim 1
wherein
said website is configured to
display a map of said associations associated with one or more subject with respect to locations of said plurality of users that made said associations.

6. The collaborative first order logic system with dynamic ontology of claim 1
wherein
said website is configured to
display said associations associated with one or more subject with respect to locations of said plurality of users over a defined time period to display how said associations have changed over time.

7. The collaborative first order logic system with dynamic ontology of claim 1
wherein
said server computer is configured to
determine a percentage of said plurality of user that agree with an assertion associated with one or more of said subjects.

8. The collaborative first order logic system with dynamic ontology of claim 1
wherein
said display said assertions associated with said subjects comprises a display of an assertion in a first format to indicate that said assertion has been proven true and display said assertion in a second format to indicate that said assertion has been proven false.

9. The collaborative first order logic system with dynamic ontology of claim 1
wherein said website is configured to
accept references to said documents;
command said server computer to store said documents or said references to said documents in said database;
accept said subjects associated with said documents;
command said server computer to store said subjects in said database;
accept said associations between said subjects;
command said server computer to store said associations in said database;
accept said assertions associated with said subjects;
command said server computer to store said assertions in said database;
accept said opinions regarding said assertions;
command said server computer to store said assertions in said database.

10. The collaborative first order logic system with dynamic ontology of claim 1
wherein
said website is configured to
accept payment for use of said database.

11. The collaborative first order logic system with dynamic ontology of claim 1
wherein
said website is configured to
accept a login from said first user via a social network site.

12. A collaborative first order logic system with dynamic ontology comprising:
a server computer;
a database coupled with said server and configured to store information related to
documents;
subjects associated with said documents;
associations between said subjects;
assertions associated with said subjects;
opinions regarding said assertions;
theorems associated with said assertions; and,
a website coupled with said server computer wherein said website is configured to
display said documents;
display said subjects associated with said documents;
display said associations between said subjects;
display said assertions associated with said subjects;
display said opinions regarding said assertions;
accept input from a plurality of users including a first user and a second user to alter said associations between said subjects;
command said server computer to alter said associations between said subjects in said database;
accept an opinion from said first user related to an assertion associated with one or more subjects wherein said assertion is made by said second user; and,
analyze said assertions and display any logical contradictions with said theorems.

13. The collaborative first order logic system with dynamic ontology of claim 12
wherein
said database is configured to store information related to opinions regarding said associations between said subjects;
said website is configured to
display said opinions regarding said associations between said subjects;
accept an opinion from said first user related to an association between one or more subjects
wherein said association is made by said first user or said second user.

14. The collaborative first order logic system with dynamic ontology of claim 12
wherein
said website is configured to
display a map of said assertions associated with one or more subject with respect to locations of said plurality of users that made said assertions;
display said assertions associated with one or more subject with respect to locations of said plurality of users over a defined time period to display how said assertions have changed over time;
display a map of said associations associated with one or more subject with respect to locations of said plurality of users that made said associations;

display said associations associated with one or more subject with respect to locations of said plurality of users over a defined time period to display how said associations have changed over time.

15. The collaborative first order logic system with dynamic ontology of claim 12
wherein
said website is configured to
accept payment for use of said database.

16. The collaborative first order logic system with dynamic ontology of claim 12
wherein
said website is configured to
accept a login from said first user via a social network site.

17. A collaborative first order logic system with dynamic ontology comprising:
a server computer;
a database coupled with said server and configured to store
information related to
documents;
subjects associated with said documents;
associations between said subjects;
assertions associated with said subjects;
opinions regarding said assertions;
theorems associated with said assertions;
opinions regarding said associations between said subjects;
a website coupled with said server computer wherein said website is configured to
accept references to said documents;
command said server computer to store said documents or said references to said documents in said database;
accept said subjects associated with said documents;
command said server computer to store said subjects in said database;
accept said associations between said subjects;
command said server computer to store said associations in said database;
accept said assertions associated with said subjects;
command said server computer to store said assertions in said database;
accept said opinions regarding said assertions;
command said server computer to store said assertions in said database;
display said documents;
display said subjects associated with said documents;
display said associations between said subjects;
display said assertions associated with said subjects comprises a display of an assertion in a first format to indicate that said assertion has been proven true and display said assertion in a second format to indicate that said assertion has been proven false;
display said opinions regarding said assertions;
accept input from a plurality of users including a first user and a second user to alter said associations between said subjects;
command said server computer to alter said associations between said subjects in said database;
accept an opinion from said first user related to an assertion associated with one or more subjects wherein said assertion is made by said second user;
display said opinions regarding said associations between said subjects;
accept an opinion from said first user related to an association between one or more subjects wherein said association is made by said first user or said second user;
display a map of said assertions associated with one or more subject with respect to locations of said plurality of users that made said assertions;
display said assertions associated with one or more subject with respect to locations of said plurality of users over a defined time period to display how said assertions have changed over time;
display a map of said associations associated with one or more subject with respect to locations of said plurality of users that made said associations;
display said associations associated with one or more subject with respect to locations of said plurality of users over a defined time period to display how said associations have changed over time;
wherein said server computer is configured to
analyze said assertions and display any logical contradictions with said theorems; and,
determine a percentage of said plurality of users that agree with an assertion associated with one or more of said subjects.

* * * * *